United States Patent [19]

Luecke

[11] Patent Number: 5,140,470
[45] Date of Patent: Aug. 18, 1992

[54] OPTICAL MOUNTING APPARATUS

[75] Inventor: Francis S. Luecke, San Jose, Calif.

[73] Assignee: New Focus, Inc., Mountain View, Calif.

[21] Appl. No.: 638,886

[22] Filed: Jan. 7, 1991

[51] Int. Cl.$^5$ ................................................ G02B 7/02
[52] U.S. Cl. .................................... 359/818; 359/819; 359/827
[58] Field of Search .................. 350/252, 257, 321; 359/819, 827, 896, 818

[56] References Cited

U.S. PATENT DOCUMENTS

| | | | |
|---|---|---|---|
| 3,893,138 | 7/1975 | Frode | 354/286 |
| 4,842,397 | 6/1989 | Eisler | 350/634 |
| 4,913,527 | 4/1990 | Jessop | 350/255 |
| 4,988,165 | 1/1991 | Ishii et al. | 350/245 |

FOREIGN PATENT DOCUMENTS 62-0907  1/1987  Japan ................... 350/252

Primary Examiner—Frank Gonzalez
Attorney, Agent, or Firm—Townsend and Townsend

[57] ABSTRACT

An optical mounting apparatus comprises an upper support assembly and a lower post assembly. The upper support assembly includes a stageplate mounted on a backing plate by a three point suspension mechanism. By locating an optical element mounting region at the corner of a rectangle defined by the three suspension points, a datum point within the region can be rotationally adjusted without simultaneous translational adjustment by manipulating only two of the three suspension points. The baseplate is mounted on a support rod which is slidably received in a casing. A lever arm having a surface which engages the support rod can be moved relative to the casing for selectively locking the rod in place.

21 Claims, 4 Drawing Sheets

OPTICAL MOUNTING APPARATUS

BACKGROUND OF THE INVENTION

The present invention relates generally to an apparatus for adjustably mounting optical elements, such as mirrors, beam splitters, lenses, gratings, and the like. More particularly, the present invention relates to an optical mount which permits adjustment of the height, rotational angle, and axial position of the optical element.

The use of adjustable mounting apparatus for supporting optical components, such as mirrors, beam splitters, lenses, gratings, and the like, is known. Common optical mounting apparatus comprise pair of generally parallel plates, of which one of the plates is fixed to a surface or base and the other plate is adjustably suspended from the first plate. Of particular relevance to the present invention, the second plate may be mounted using a "three-point suspension," where adjustment of the perpendicular distance between the plates at each of the three suspension points can provide for axial and rotational adjustment of the second plate.

An exemplary conventional optical mounting apparatus is illustrated in FIGS. 1 and 2. Such conventional apparatus includes a base plate 10 and a stage plate 12, where the plates are held together by a plurality of springs 14 (one of which is illustrated). Three adjustments screws 16, 18, and 20 are threadably received through the base plate 10 and engage the rear surface (i.e. the surface disposed toward the base plate) of the stage plate 12. In this way, the desired "three-point suspension" mechanism is provided.

An aperture 22 is provided in the stage plate 12 in order to support the desired optical element. Usually, a similar aperture 24 is provided in the base plate 10 so that an unobstructed optical path is formed through the mount.

The three-point suspension system illustrated in FIGS. 1 and 2 is advantageous since it provides for rotation of the optical element mounted in aperture 22 about both the horizontal and vertical axis as well as axial translation of the optical element along the axis normal to the plain defined the base plate 10. Most simply, rotation of the optical element about the vertical axis (relative to the apparatus as illustrated in FIGS. 1 and 2) may be achieved by adjustment of either screws 16 and 18 (by an equal amount) or adjustment of screw 20 alone. Similarly, rotation of the optical element about the horizontal axis may be achieved by adjustment of screws 18 and 20 together or by adjustment of screw 16 alone.

Such a straight forward approach, however, suffers from the drawback that rotation of the optical element also results in translation (usually unintended) of the optical element in the direction perpendicular to the plane defined by base plate 10. To overcome this problem, it is necessary that all three adjustments screws 16, 18, and 20 be adjusted whenever the optical element is to be rotated without a change in its axial position.

For these reasons, it would be desirable to provide improved optical mounting apparatus where the optical element could be rotated about a single axis by adjustment of only a pair of adjustment screws without affecting the axial position of the optical element. It would be particularly desirable if such apparatus were similar to conventional apparatus in most respects but allowed for simplified rotational adjustment of the stage plate.

Optical mounting apparatus as illustrated in FIGS. 1 and 2 are frequently supported on a vertically-adjustable post assembly. Such post assemblies frequently include a cylindrical casing having a rod slidably received therein. The rod may be secured by means of a simple set screw, a split collar having a locking screw, or the like. Generally, however, such locking mechanisms require tightening and/or loosening using a screw element which requires the user to spend at least several seconds each time the height of the rod is to be adjusted. Moreover, the action of locking will often affect the alignment which has just been set, necessitating further alignment. When numerous of fine adjustments are being made, the need to continually tighten and loosen such screw-type locking mechanisms can be most inconvenient.

Thus, it would be desirable to provide optical mounting apparatus having improved vertical locking devices. In particular, it would be desirable if the rod in such apparatus could be freed for vertical adjustment simply by pressing a single button and further if the rod could be relocked by releasing pressure from the button.

SUMMARY OF THE INVENTION

According to the present invention, an improved optical mounting apparatus permits simplified manual adjustment of both the angular rotation and height of an optical element supported by the apparatus. The apparatus are similar in most respects to conventional optical of mounting apparatus, thus permitting their use and substitution in optical system layouts in place of conventional optical mounting apparatus.

In a first aspect of the present invention, improved rotational adjustment of an optical element is provided in a parallel plate optical mount with a generally conventional three-point suspension of the type illustrated in FIGS. 1 and 2. Instead of locating the optical mounting region at the center of the stage plate (i.e. generally at the middle of the hypotenuse of the right triangle formed by the three suspension points), however, the optical mounting region is located at the corner of a rectangle, where the remaining three corners are defined by the suspension points, i.e. the locations of the three adjustments screws. As will be explained in detail hereinafter, such a change in the location of optical mounting region permits rotational adjustment of the optical element by use of two adjustments screws without affecting the axial position of a selected datum on the optical element.

In a second aspect of the present invention, improved height adjustment is provided by a mounting post including a casing having an axial cylindrical hole with a distal opening and a side aperture. A rod is slidably received through the distal opening of the axial cylindrical hole, and the lever arm includes a shoulder which is pivotably mounted through the side aperture. The lever arm is arranged so that movement of its distal end away from the casing causes the shoulder to cant against the rod, thus locking the rod in place. A spring is provided between the casing and the lever arm so that the shoulder will normally be canted and the rod will normally be locked unless the user has intentionally depressed the lever arm toward the casing. Such an arrangement facilitates adjustment and readjustment of the height of the rod relative to the casing. In the preferred embodiment, a locking screw is threadably received in the lever arm to permit the user to selectively lock the rod in place once the proper position has been achieved.

DESCRIPTION OF THE SPECIFIC EMBODIMENTS

Figure 1:
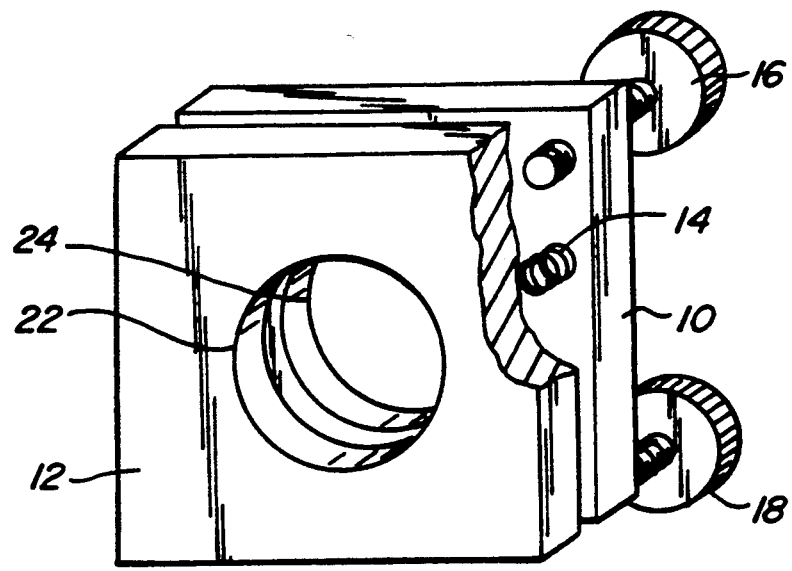
FIGS. 1 and 2 illustrate a prior art optical mounting apparatus having a conventional three-point suspension mechanism.
Figure 2:
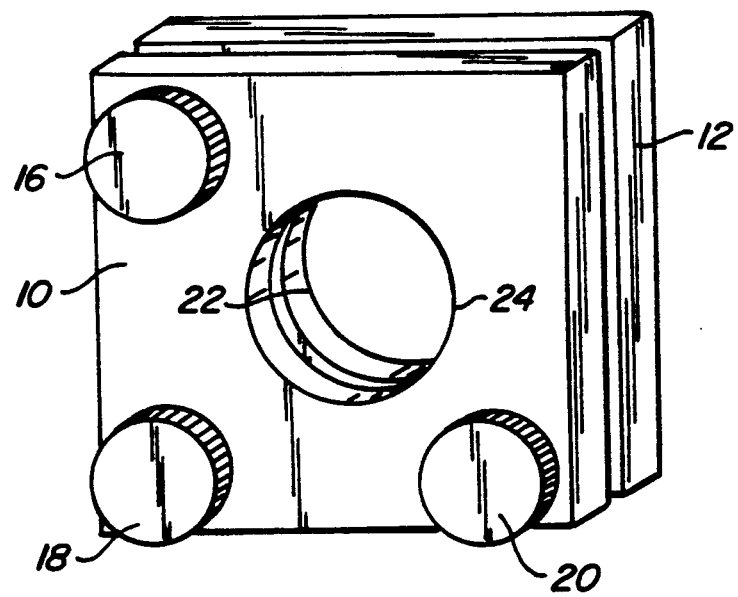
Figure 3:
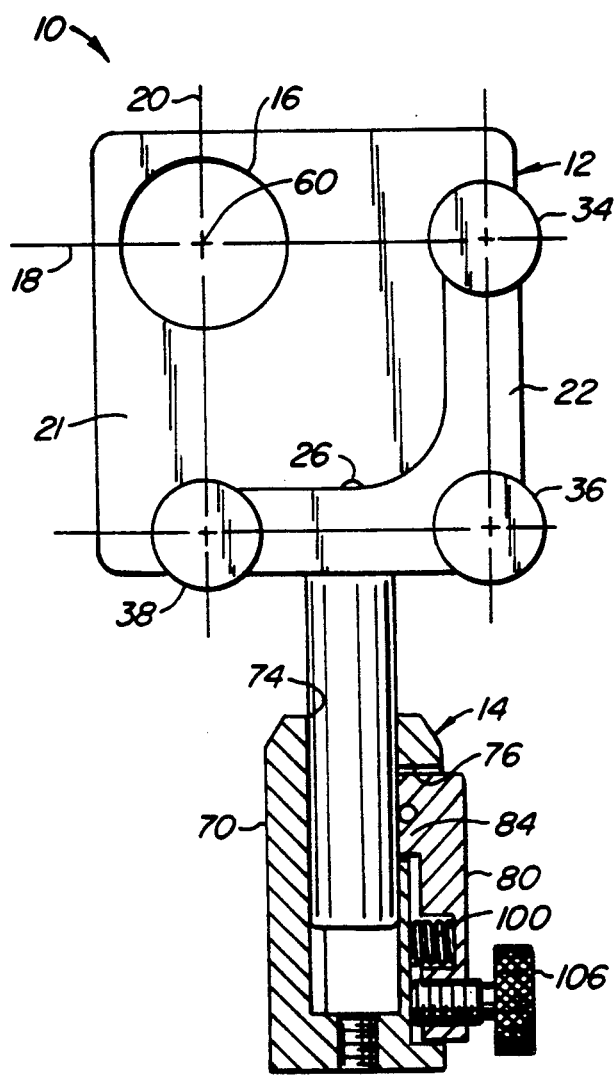
FIG. 3 illustrates a front elevational view of an optical mounting apparatus constructed in accordance with the principles of the present invention, shown with a portion of the mounting post in cross-section.
Figure 4:
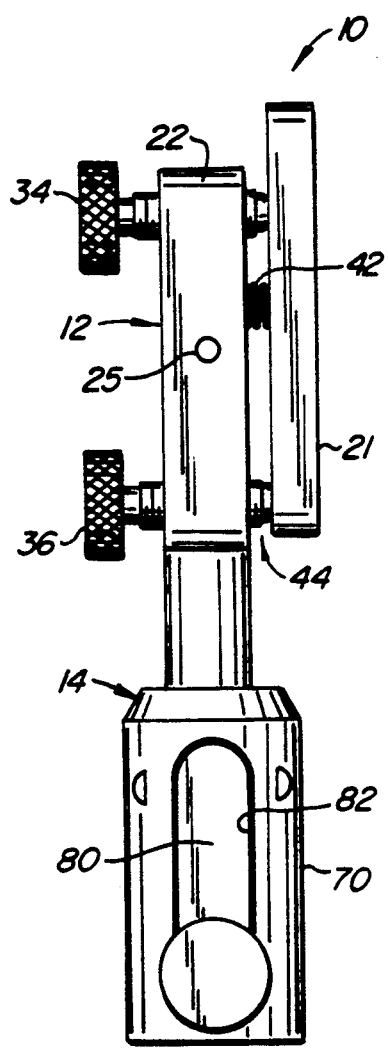
FIG. 4 is a side elevational view of the optical mounting apparatus of FIG. 3.
Figure 5:
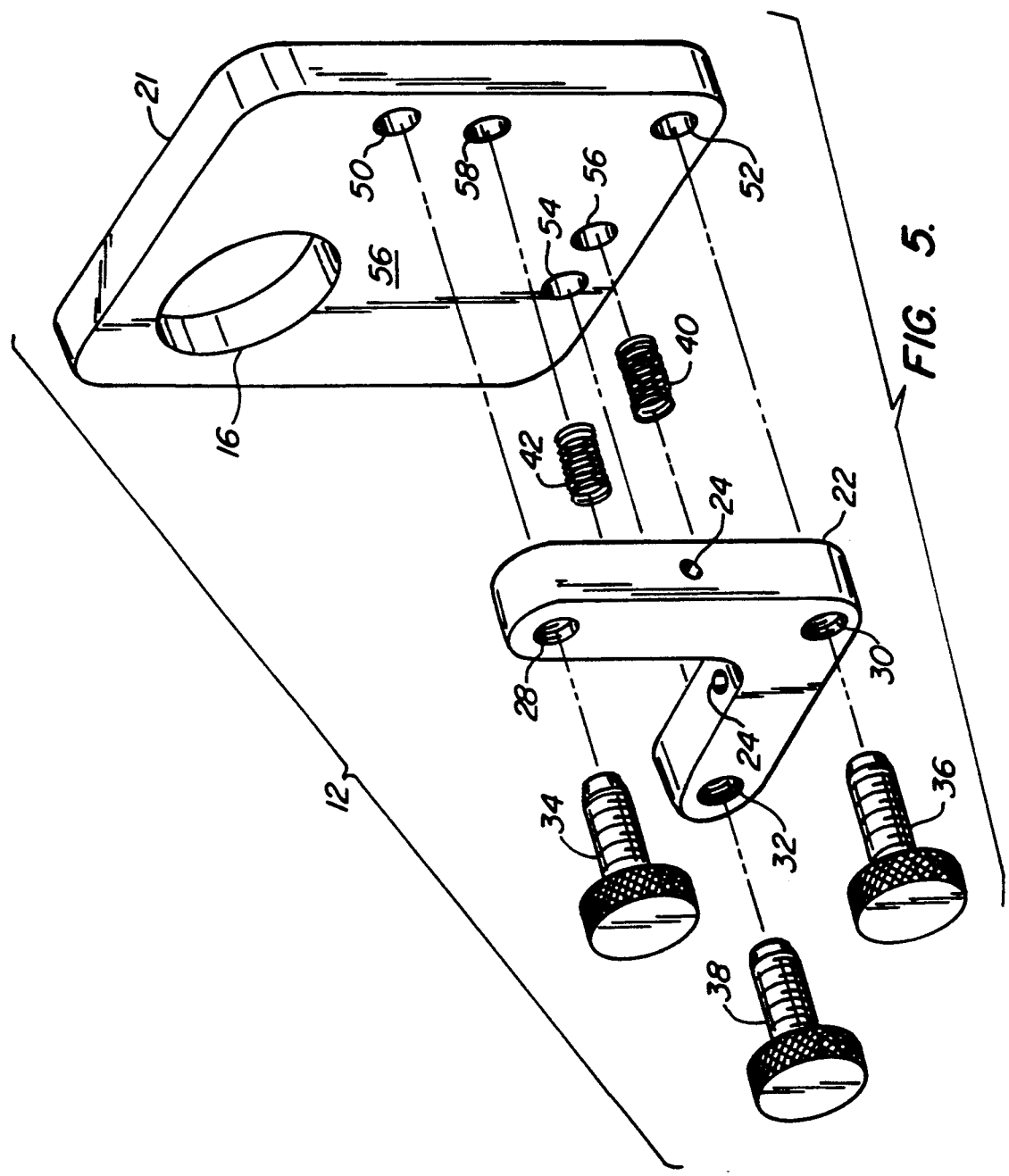
FIG. 5 is an exploded view of the base plate and stage plate of the optical mounting apparatus of FIGS. 3 and 4.
Figure 6:
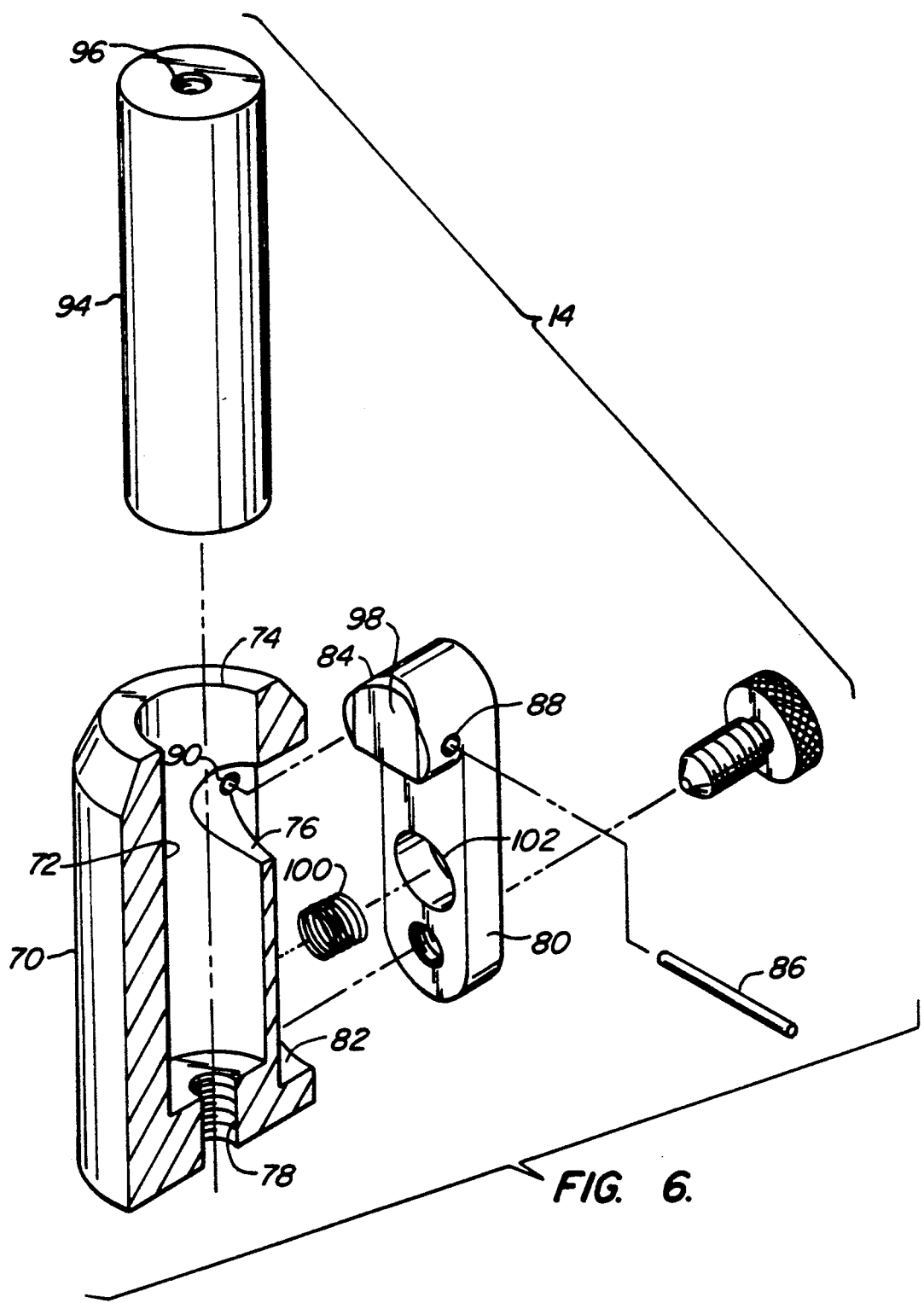
FIG. 6 is an exploded view of the adjustable height and mounting post of the optical mounting apparatus of FIGS. 3 and 4.

An optical mounting apparatus 10 constructed in accordance with the principles the present invention is illustrated in FIGS. 3 and 4. The apparatus 10 includes an upper support assembly 12 (illustrated in detail in FIG. 5) and a lower post assembly 14 (illustrated in detail in FIG. 6). An optical element mounting region 16 is located on the upper support assembly 12, and the upper support assembly 12 allows for rotational adjustment of the mounting region 16 about both a horizontal axis 18 and a vertical axis 20, as will be described in greater detail hereinafter. The lower post assembly 14 provides for vertical translational adjustment of the mounting region 16, as will also be described in greater detail hereinafter.

Reference to horizontal and vertical direction will always be made relative to axes 18 and 20 as set forth in FIG. 3. Such references are made for convenience, and it will be appreciated that the optical mounting apparatus 10 may be mounted in other than a vertical orientation, in which case the actual movement of the optical element mounting 16 will be made relative to a different set of orthogonal axes.

The upper support assembly 12 includes a stage plate 21 and a baseplate 22. The baseplate 22 includes means for attachment to the lower post assembly, such as an attachment hole 24 capable of receiving an attachment screw 26 (FIG. 3). A second (alternate) attachment hole 25 is provided so that the stage plate 21 may be rotated by 90° to move the mounting region 16 relative to the lower post assembly 14. It will be appreciated that a wide variety of other attachment means, such as snaps, clamps, anchors, and the like, could be employed. Alternatively, the upper support assembly 12 and lower post assembly 14 could be permanently affixed, such as by welding, the use of adhesives, and the like.

The baseplate 22 includes three threaded ports 28, 30, and 32 capable of receiving three adjustment screws 34, 36, and 38, respectively. The threaded ports 28, 30, and 32 are arranged at the corners of a right triangle and are usually equidistant from each other. As illustrated, the baseplate 22 has an L-shaped configuration with the threaded ports 28, 30, and 32 located at the extremities of and junction between the two legs of the "L." Baseplate 22 could have a wide variety of other configurations, but the L-shaped configuration is convenient since it avoids interference with the optical element mounting region 16 on the stageplate 21.

The stageplate 21 is held to the baseplate 22 by a pair of coil springs 40 and 42 which are maintained under tension so that a gap 44 (FIG. 4) between the plates would have a tendency to close in the absence of the adjustment screws 34, 36, and 38. That is, it is the force provided by the adjustment screws 34, 36, and 38 which maintains the gap 44, and to the extent the adjustment screws are moved away from the stageplate 21 (i.e. to the left in FIG. 4), the gap 44 will diminish. Usually, the springs 40 and 42 will be located so that the compressive force is equally distributed between the three adjustment screws 34, 36, and 38.

The adjustment screws 34, 36, and 38 engage the stageplate 21 in shallow receptacles 50, 52, and 54 which are coplanar and formed in surface 56 of the stageplate which is disposed toward the baseplate 22. Similarly, coil springs 40 and 42 are received in attachment receptacles 56 and 58, respectively.

As best observed in FIG. 3, the center 60 of mounting region 16 is located at a corner of a rectangle, usually a square, which is defined by the locations of the shallow receptacles 50, 52, and 54. It is this location of the optical mounting region which, in part, distinguishes the mounting apparatus of the present invention from that of the prior art. The center 60 of the mounting region defines a datum point which can be rotationally adjusted about both the horizontal axis 18 and the vertical axis 20, without any significant translation of the datum in a direction normal to the plane defined by baseplate 22. In particular, the datum 60 of optical mounting region 16 may be rotated relative to the horizontal axis 18 by translating adjustment screws 36 and 38 in the direction relative to the plane defined by baseplate 22. That is, using adjustment screws 36 and 38 to move the stageplate 21 away from the baseplate 22 (i.e., to the right in FIG. 4), will cause the datum 60 to rotate in a counterclockwise direction as viewed in FIG. 4. In contrast, adjustment of screws 36 and 38 to allow the stageplate 21 to move toward baseplate 22 will allow the datum to rotate in the clockwise direction, as viewed in FIG. 4. In neither case is it necessary to adjust screw 34 to prevent horizontal translation of the datum, as with prior art devices.

Rotation of the datum 60 and optical mounting region 16 about the vertical axis 20 may be achieved by adjustment of screws 34 and 36, without any adjustment of screw 38. Adjustment of screws 34 and 36 to allow stageplate 21 to move closer to baseplate 22 causes the datum to rotate in a first direction, while adjustment that causes the stageplate to move away from the baseplate causes the datum to rotate in the opposite direction.

The optical mounting region 16 is illustrated a an aperture stage plate 21. It will be appreciated that the mounting region may comprise a wide variety of other configurations which permit mounting of the desired optical element, such as a mirror, lens, diffraction grating, beam splitter, and the like on the stageplate 21.

The lower post assembly 14 includes a casing 70 having an axial cylindrical hole 72 with a distal opening 74 and side aperture 76. A mounting hole 78 is formed at a proximal end of the casing 70 and is suitable for mounting the casing on any flat surface using, e.g., a mounting screw (not illustrated). While usually the flat surface would be horizontal, it will be appreciated that the surface can assume virtually any orientation.

A lever arm 80 is received in a slot 82 formed in a side of the casing 70 adjacent the side aperture 76. Lever 80 includes shoulder 84 at a proximal end thereof, and shoulder 84 is sized so that it fits into aperture 76 when the lever arm 80 is in place in slot 82. The shoulder 84 is pivotally mounted on a pin 86 which passes through a bearing cylindrical hole 88 in the shoulder and into pin receptacles 90 (only one of which is illustrated) in the casing 70.

A cylindrical rod 94 having a mounting hole 96 at its upper end is slidably received in the cylindrical hole 72 of casing 70. The upper support assembly 12 may be secured to the rod 94 using screw 26 which is received in mounting hole 96, as best observed in FIG. 3.

Upward and downward movement of the rod 94 in cylindrical hole 72 of casing 70 allows for vertical adjustment of the upper support assembly 12 and consequently the optical element mounting region 16. The lever arm 80 provides for locking of the rod 94 relative to the casing 70, as will now be described.

The shoulder 84 of lever 80 includes a cylindrically concave surface 98 having a curvature which corresponds generally to the exterior of rod 94. When the lever arm 80 is properly aligned with the casing 70, the surface 98 will be generally parallel to the exterior rod 94, allowing the rod to move freely in cylindrical hole 72. By moving lever arm 80 away from the casing 70, however, the surface 98 will cant against the exterior of rod 94, thus locking rod 94 in place.

A compressed spring 100 is provided between the casing 70 and the lever arm 80 (being received in a receptacle 102 in the lever arm), causing the surface 98 to cant against the rod 94 when the support assembly 12 is in its "shelf" condition. That is, so long as a support assembly is undisturbed, the rod 94 will be in a generally locked configuration. The user, however, may free the rod 94 by simply depressing the proximal end of lever 80 toward the casing 70. Such depression relieves the canting of surface 98 and allows the rod to move freely in cylindrical hole 72.

Once the height of support 12 is properly adjusted, the rod 94 may be locked against further inadvertent changes by use of a locking screw 106 which is threadably received to the proximal end of lever arm 80. Locking screw 106 can be rotated so that is extends toward the casing 70, thus moving the proximal end of the lever away from the casing. When the lever arm 80 is thus locked, the user cannot accidentally depress the proximal end to inadvertently release the rod 94.

It will be appreciated that the coil spring 100 can be placed by a variety of other elastic elements, such as leaf springs, and the like.

Although the foregoing invention has been described in detail for purposes of clarity of understanding, it will be obvious that certain modifications may be practiced within the scope of the appended claims.

What is claimed is:

1. An apparatus for adjustably mounting an optical element, said apparatus comprising:
   a stage plate having at least four coplanar locations arranged in a rectangular pattern;
   means at a first of the four coplanar locations for removably securing the optical element;
   a base plate disposed generally parallel to but spaced-apart from the stage plate;
   means on the base plate for securing the base plate to a surface; and
   means at each of a second, third, and fourth of the four coplanar locations for selectively adjusting the perpendicular distance between the location and the base plate.

2. An apparatus as in claim i, wherein the four coplanar locations are arranged in a square pattern.

3. An apparatus as in claim 1, wherein the means for removably securing the optical element is an aperture.

4. An apparatus as in claim 1, wherein the base plate has an L-shape corresponding to two contiguous legs of the rectangular pattern.

5. An apparatus as in claim 1, wherein the means for securing the base plate to a surface comprises a threaded receptacle.

6. An apparatus as in claim 1, wherein the means for securing the base plate to a surface includes an adjustable height mounting post including:
   a casing having an axial cylindrical hole with a distal opening and a side aperture;
   means at a proximal end of the casing for mounting the casing on a surface;
   a rod slidably received through the distal opening of the cylindrical hole;
   a lever arm having a shoulder at a proximal end thereof, said shoulder pivotably attached within the aperture of the casing so that the shoulder cants against the rod to hold said rod in place when a distal end of the lever arm is moved away from the casing; and
   a compressed spring disposed to move the distal end of the lever arm away from the casing.

7. An apparatus for adjustably mounting an optical element, said apparatus comprising:
   a stage plate having four coplanar locations arranged in a rectangular pattern;
   means at a first of the four coplanar locations for removably securing the optical element;
   a base plate;
   means on the base plate for securing the base plate to a surface;
   elastic means for holding the stage plate and base plate together in a generally parallel but spaced-apart orientation; and
   three adjustment screws threadably mounted in the base plate and positioned to engage the stage plate at each of the second, third, and fourth of the coplanar locations, whereby the perpendicular distance between the location and the stage plate may be independently adjusted.

8. An apparatus as in claim 7, wherein the four coplanar locations are arranged in a square pattern.

9. An apparatus as in claim 7, wherein the means for removably securing the optical element is an aperture.

10. An apparatus as in claim 7, wherein the base plate has an L-shape corresponding to two contiguous legs of the rectangular pattern.

11. An apparatus as in claim 7, wherein the means for securing the base plate to a surface comprises a threaded receptacle.

12. An apparatus as in claim 7, wherein the means for securing the base plate to a surface includes an adjustable height mounting post including:
   a casing having an axial cylindrical hole with a distal opening and a side aperture;
   means at a proximal end of the casing for mounting the casing on a surface;
   a rod slidably received through the distal opening of the cylindrical hole;

a lever arm having a shoulder at a proximal end thereof, said shoulder pivotably attached within the aperture of the casing so that the shoulder cants against the rod to hold said rod in place when a distal end of the lever arm is moved away from the casing; and a compressed spring disposed to move the distal end of the lever arm away from the casing.

13. An apparatus as in claim 7, wherein the elastic means for holding the stage plate and the base plate together comprises at least one coil spring.

14. An apparatus as in claim 13, wherein the elastic means comprises a pair of coil springs located generally between adjacent pairs of coplanar locations.

15. In an improved apparatus for adjustably mounting an optical element, said apparatus being of the type including a stage plate and a three-point suspension system for said stage plate, wherein the three points lie along a first pair of lines which intersect at a common suspension point, the improvement comprising means on the stage plate for removably securing the optical element disposed at an intersection between a second pair of lines parallel to the first pair of lines and passing through the non-common suspension points.

16. In an improved apparatus as in claim 15, wherein the three suspension points and the securing means are arranged in a square pattern.

17. An adjustable height mounting post comprising:

a casing having an axial cylindrical hole with a distal opening and a side aperture;

means at a proximal end of the casing for mounting the casing on a surface;

a rod slidably received through the distal opening of the cylindrical hole;

a lever arm having a shoulder at a proximal end thereof, said shoulder pivotably attached within the aperture of the casing so that the shoulder cants against the rod to hold said rod in place when a distal end of the lever arm is moved away from the casing; and a compressed spring disposed to move the distal end of the lever arm away from the casing.

18. An adjustable height mounting post as in claim 17, further comprising means for locking the distal end of the lever arm away from the casing.

19. An adjustable height mounting post as in claim 8, wherein the locking means is a thumb screw threadably received in the distal end of the lever arm and disposed to engage the casing, whereby tightening the thumb screw moves the lever arm away from the casing.

20. An adjustable height mounting post as in claim 17, wherein the cylindrical hole and rod are cylindrical and the shoulder of the lever arm has a surface which conforms to the curvature of the cylindrical hole.

21. An adjustable height mounting post as in claim 17, wherein the compressed spring is a coil spring.

* * * * *